(12) United States Patent
Smith et al.

(10) Patent No.: US 9,111,100 B2
(45) Date of Patent: Aug. 18, 2015

(54) PRIVACY AWARE DHCP SERVICE

(71) Applicant: Intel Corporation, Santa Clara, CA (US)

(72) Inventors: Ned M. Smith, Beaverton, OR (US); Thomas G. Willis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 13/994,422

(22) PCT Filed: Mar. 14, 2013

(86) PCT No.: PCT/US2013/031258
§ 371 (c)(1),
(2) Date: Jun. 14, 2013

(87) PCT Pub. No.: WO2014/142864
PCT Pub. Date: Sep. 18, 2014

(65) Prior Publication Data
US 2014/0283099 A1    Sep. 18, 2014

(51) Int. Cl.
*G06F 11/00* (2006.01)
*G06F 21/57* (2013.01)

(52) U.S. Cl.
CPC .............. *G06F 21/577* (2013.01); *G06F 11/00* (2013.01)

(58) Field of Classification Search
CPC ..................................................... G06F 11/00
USPC ......................................................... 726/26
See application file for complete search history.

(56) References Cited

U.S. PATENT DOCUMENTS

| 7,194,424 | B2 | 3/2007 | Greer et al. |
| 7,689,672 | B2 | 3/2010 | Kanojia et al. |
| 8,726,379 | B1 * | 5/2014 | Stiansen et al. ................. 726/22 |
| 2008/0028066 | A1 | 1/2008 | Berkhin et al. |
| 2008/0092213 | A1 | 4/2008 | Wei et al. |
| 2008/0222283 | A1 | 9/2008 | Ertugrul et al. |
| 2009/0019164 | A1 | 1/2009 | Brown et al. |
| 2011/0047289 | A1 | 2/2011 | Venkatachalam et al. |
| 2012/0158516 | A1 | 6/2012 | Wooten, III et al. |
| 2013/0007837 | A1 | 1/2013 | King |
| 2014/0006704 | A1 | 1/2014 | Greenfield et al. |

FOREIGN PATENT DOCUMENTS

EP    2 395 463 A1    12/2011

* cited by examiner

*Primary Examiner* — Jacob Lipman
(74) *Attorney, Agent, or Firm* — Grossman, Tucker, Perreault & Pfleger, PLLC

(57) ABSTRACT

Generally, this disclosure describes a system including a privacy aware DHCP service and a user device. The user device includes a trusted execution environment including a client privacy agent configured to request a first Internet Protocol (IP) address from a DHCP service and to determine a device privacy score based, at least in part, on a DHCP policy; memory comprising secure storage configured to store the first IP address; and communication circuitry configured to establish at least one connection between the user device and at least one entity over a network using the first IP address. The client privacy agent is configured to monitor communication activity over the connection(s), to update the device privacy score based, at least in part, on the communication activity, and to close the connection(s) if the device privacy score is outside an acceptable privacy score range, the acceptable privacy range bounded by a privacy threshold.

22 Claims, 4 Drawing Sheets

PRIVACY AWARE DHCP SERVICE

FIELD

This disclosure relates to DHCP (Dynamic Host Configuration Protocol), more particularly privacy aware DHCP service.

BACKGROUND

With the adoption of Internet Protocol version 6 (IPv6) and its associated 128-bit address space ($3.40 \times 10^{38}$ addresses), the IP address space (32-bit, $4.29 \times 10^9$ addresses) limitations associated with Internet Protocol version 4 (IPv4) no longer exist. In the IPv4 address space, DHCP (Dynamic Host Configuration Protocol) service is configured to facilitate IP address reuse given the constrained address space of IPv4. Because of its size, the address space of IPv6 obviates address reuse and instead supports statically assigned IP addresses that may be used by communication devices for many or all of their network communications.

Unfortunately, such statically assigned IP addresses are also unique identifiers that provide a means for gathering personally identifiable information related to a user. Network operators, internet service providers (ISPs) and e-commerce exchange operators may record user transactions associated with the user's static IP address. The network operators, ISPs and e-commerce exchange operators may then build a database of these recorded transactions that may ultimately reveal more information about the user than the user intended be revealed or that the operator is entitled to know. Thus, such statically assigned IP addresses made possible by IPv6 may jeopardize user privacy.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure describes a system and method configured to enhance user privacy for communication that utilizes Internet Protocol version 6 (IPv6) by exploiting the size of the IPv6 address space. The method and system include a privacy aware enhanced privacy Dynamic Host Configuration Protocol (EP DHCP) service configured to provide a previously unassigned IP address to a user device and a Client Privacy Agent (CPA) executing in a trusted execution environment in the user device. The EP DHCP service is configured to acquire a relatively large number of IPv6 addresses from an IP address authority and to avoid providing the same IP address to a user device more than once. The user device is configured to utilize the assigned IP address to establish a connection for communication over a network with an entity, e.g., a web service. As used herein, entities may include, but are not limited to, web services, network operators, internet service providers and/or e-commerce exchange providers.

The CPA is configured to monitor the number of connections that utilize the assigned IP address as well as communication activity on the connection(s). Communication activity may include, but is not limited to a number and characteristics of transactions associated with each connection and/or characteristics (e.g., trustworthiness) of communication partners (i.e., entities). The CPA is further configured to determine a device privacy score (i.e., anonymity index) based, at least in part, on the number of connections and/or the communication activity and to cause the connection to be closed if the privacy score reaches a predefined privacy threshold (i.e., anonymity threshold). In some embodiments, the device privacy score may be a composite score that includes individual privacy scores associated with other user device activities, e.g., related to context information, as described herein. By utilizing unique addresses selected from a sufficiently large database of IP addresses and closing connections when a privacy (anonymity) threshold is reached, entities including, but not limited to network operators, ISPs and e-commerce exchange operators may be prevented from building a database of personally identifiable information of a user that ultimately identifies the user and/or the user device. User privacy may thus be protected.

Figure 1:
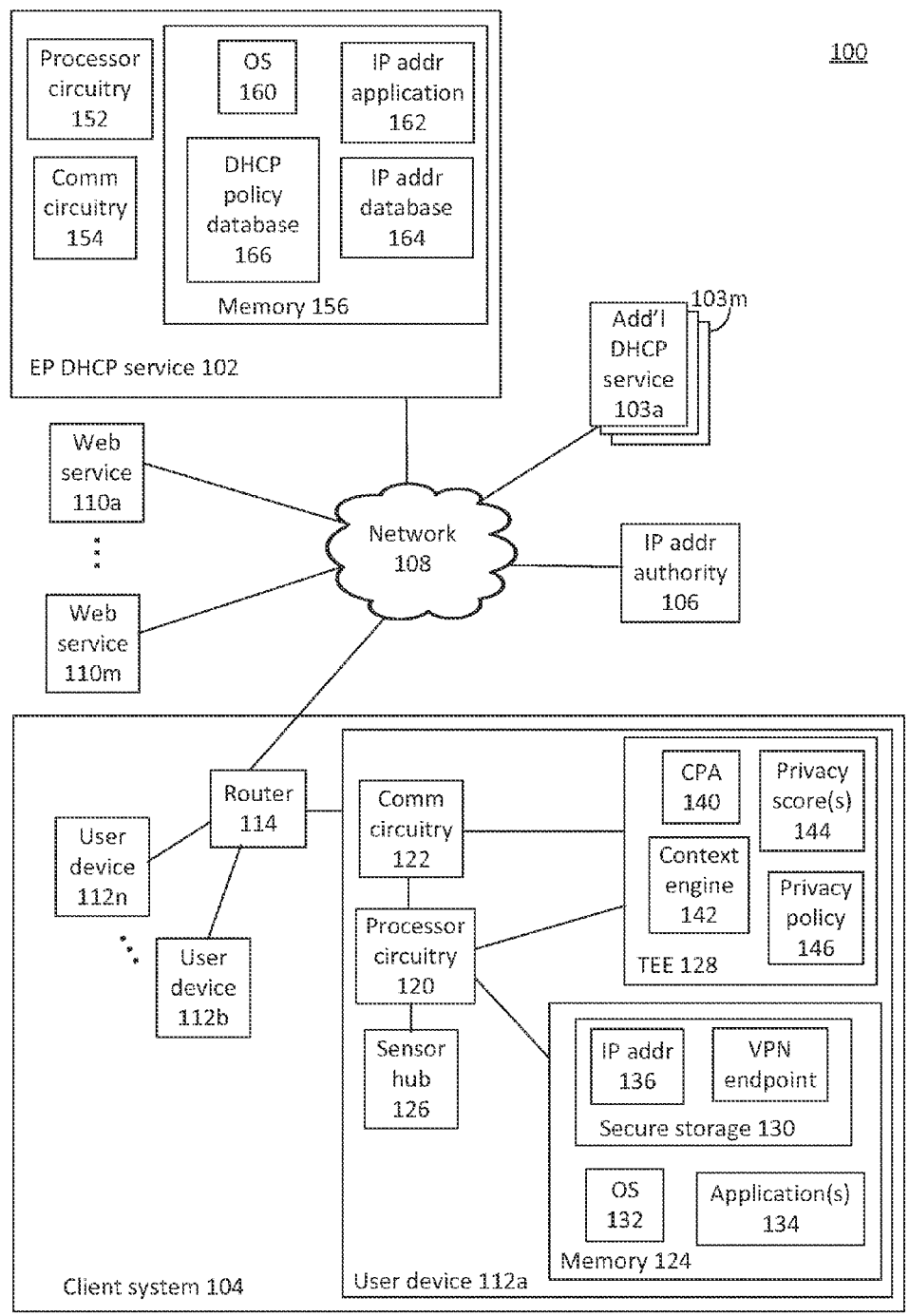
FIG. 1 illustrates a system that includes an EP DHCP service and a client privacy agent consistent with various embodiments of the present disclosure.

FIG. 1 illustrates a system 100 that includes an EP DHCP service 102 and a client system 104 that may include a plurality of user devices 112a, . . . , 112n consistent with various embodiments of the present disclosure. User devices 112a, . . . , 112n may include computing devices including, but not limited to, desktop computers, laptop computers, tablet computers (e.g., iPad®, GalaxyTab® and the like), ultraportable computers, ultramobile computers, netbook computers, subnotebook computers, mobile telephones, smart phones, (e.g., iPhones®, Android®-based phones, Blackberries®, Symbian®-based phones, Palm®-based phones, etc.), feature phones, personal digital assistants, enterprise digital assistants, mobile internet devices, personal navigation devices, etc.

The system 100 may include a plurality of additional DHCP services 103a, . . . , 103m. The system 100 further includes an IP address authority 106 configured to provide blocks of unassigned IP addresses to EP DHCP service 102 and to one or more of the additional DHCP services 103a, . . . , 103m. The IP addresses in each block may or may not be contiguous. For example, the IP address authority may include Internet Assigned Numbers Authority (IANA) and/or a regional Internet registry (RIR), e.g., American Registry for Internet Numbers (ARIN), Asia-Pacific Network Information Centre (APNIC).

The system 100 may include network 108 configured to couple EP DHCP service 102 and/or additional DHCP services 103a, . . . , 103m to IP address authority 106 and client system 104. The system 100 may include one or more web service(s) 110a, . . . , 110m. A web service is a system designed to support interoperable machine-to-machine interaction over a network. For example, web service 110a may be associated with one or more e-commerce web sites.

EP DHCP service 102 may include processor circuitry 152, communication circuitry 154 and memory 156. Processor circuitry 152 may include one or more processors configured to perform operations associated with EP DHCP service 102. Communication circuitry 154 is configured to communicate, wired and/or wirelessly, with IP address authority 106, client system 104 and/or a client device, e.g. client device 112a, via network 108, using one or more communication protocols, as described herein. Memory 124 is configured to store an operating system OS 160, an IP address application 162 and an IP address database 164. Memory 124 may be configured to store a policy database 166.

EP DHCP service 102, e.g., using IP address application 162, is configured to request one or more block(s) of IP addresses from IP address authority 106. Similarly, additional DHCP services 103a, ..., 103m may be configured to request blocks of IP addresses from IP address authority 106. For example, the blocks of IP addresses requested by the EP DHCP service 102 may include a number, M, of IP addresses. The number M may be selected to be sufficiently large so as to allow the EP DHCP service 102 to assign a plurality of unassigned IP addresses to a requesting user device without assigning a same IP address more than once. Further, the number of possible IP addresses should be sufficiently large such that determining a particular IP address based on the possible IP addresses is no better than random guessing. Thus, a relatively larger M is more desirable than a relatively smaller M. Generally, the number of IP addresses should be at least two million. Fewer than two million may increase the likelihood that a particular IP address may be determined by an entity with a probability that is better than the probability associated with random guessing. For example, M may be in the range of three million to four million IP addresses. Increasing M to greater than four million may not significantly affect a device privacy score due to other contributions to the privacy score determination.

The number of IP addresses requested by EP DHCP service 102 may depend on a DHCP policy. e.g. DHCP policy 166. For example, as IP addresses are assigned, e.g., to user devices 112a, ..., 112n, EP DHCP service 102 may be configured to request additional blocks IP addresses from IP address authority 106. IP address application 162 may be configured to monitor IP address database 164 and to request additional blocks of IP addresses when a number of assigned addresses reaches a predetermined fraction of the M IP addresses. For example, the predetermined fraction may be one half. The predetermined fraction may be included in DHCP policy 166. The additional DHCP services 103a, ..., 103m may also request blocks of IP addresses from IP address authority 106. One or more of the additional DHCP services 103a, ..., 103m may also have policies for requesting and/or assigning IP addresses. The policies of the additional DHCP services may be similar to or different from the DHCP policy 166 of the EP DHCP service. A user device, e.g. user device 112a, may then be configured to select a DHCP service (either EP DHCP service 102 or one of the additional DHCP services 103a, ..., 103m) based, at least in part, on the respective policy.

In some embodiments, user device, e.g., user device 112a, may be configured to utilize a plurality of IP addresses. For example, the user device 112a may utilize a non-enhanced privacy IP address for local communication with a trusted entity and an EP IP address for communication over a network with an untrusted (or less trusted) entity, e.g., web service 110a. Thus, enhanced privacy functionality of the EP IP address may be utilized where it is most beneficial.

Thus, EP DHCP service 102 is configured to facilitate maintaining the privacy of a user device that received an IP address from the EP DHCP service 102 by maintaining an adequate number of unassigned IP addresses. Maintaining an adequate number of unassigned IP addresses is configured to facilitate ensuring that an assigned IP address is unique in a community of IP addresses of a known minimum size (e.g., one half of M), a desirable privacy property. The EP DHCP service 102 may thus avoid assigning a same IP address to the user device more than once. Such IP addresses provided according to policy 166 may be termed enhanced privacy (EP) IP addresses. Entities attempting to use the assigned EP IP address to correlate information about the user and/or the user device may thus be reduced to random guessing.

Client system 104 includes a router 114 in addition to the plurality of user devices 112a, ..., 112n. The user devices 112a, ..., 112n may be coupled to network 108 (and thereby EP DHCP service 102, additional DHCP services 103a, ..., 103m and/or web service(s) 110a, ..., 110m) via the router 114. Router 114 is configured to facilitate provision of an IP address from a DHCP service, e.g., EP DHCP service 102, to user devices 112a, ..., 112n, as described herein. Router 114 may be coupled to user devices 112a, ..., 112n, wired or wirelessly, and may be configured to communicate with user devices 112a, ..., 112n using one or more communication protocols. The communication protocols may include, but are not limited to, Wi-Fi, 3G, 4G and/or some other communication protocol.

For example, a user device, e.g., user device 112a, may initiate a request for an IP address by obtaining a NAT (network address translation) address from router 114. User device 112a may then broadcast a request for an IP address over network 108. EP DHCP service 102 may then reply to user device 112a and user device 112a may establish a connection with EP DHCP service 102 in order to obtain the IP address. EP DHCP service 102 is configured to select an unassigned IP address for assignment to user device 112a that is not a repeat of an IP address previously assigned to user device 112a, as described herein.

User device 112a may include processor circuitry 120, communication circuitry 122, memory 124 and sensor hub 126. Processor circuitry 120 may include one or more processors configured to perform operations associated with user device 112a. Communication circuitry 122 is configured to communicate, wired and/or wirelessly, with EP DHCP service 102, additional DHCP services 103a, ..., 103m and/or web services 110a, ..., 110m via network 108, using one or more communication protocols, as described herein. The communication protocols may include, but are not limited to, Wi-Fi, 3G, 4G and/or some other communication protocol. The sensor hub 126 includes one or more sensors, e.g., GPS, gyroscope, and the like that may be utilized to provide context information, as described herein.

Memory 124 is configured to store an operating system OS 132 and one or more applications 134. Memory 124 may include secure storage 130. Access to data stored in the secure storage 130 may be limited through, for example, cryptographic techniques. For example, an IP address received from EP DHCP service 102, e.g. EP IP address 136, may be stored in the secure storage 130.

User device 112a may include a trusted execution environment TEE 128. Trusted execution environment 128 is configured to provide a trusted execution and storage environment, e.g. may comply with a Trusted Platform Module (TPM) protocol, as described herein. TEE 128 may come in various forms or be provided by various technologies, such as Trusted Execution Technology ("TXT") by the Intel Corporation of Santa Clara, Calif., Manageability Engine ("ME"), the TrustZone Security System by ARM Holdings in Cambridge, United Kingdom. Virtualization Technology ("VT-x"), or microcode enforced thread and memory access isolation. The trusted execution environment 128 may include client privacy agent CPA 140, context engine 142, privacy score(s) (anonymity index(es)) 144 and privacy policy 146. Provision of CPA 140 in the TEE 128 is configured to provide a level of confidence that no malware that may be resident in user device 112a is compromising the IP address and, therefore able to correlate activity with the IP address.

In some embodiments, user devices 112a, . . . , 112n may be preconfigured (e.g., during manufacturing) with data, such as an "enhanced privacy identifier." or "EPID," necessary to authenticate themselves to, e.g., EP DHCP service 102. The EPID may be used by CPA 140 to establish trustworthiness of, or "endorse," user device 112a. e.g., to EP DHCP service 102, without enabling identification of a user of user device 112a and/or user device 112a itself. In various embodiments, the EPID, and in particular, a respective EPID private key, may be provisioned to a respective user device 112a, . . . , 112n, e.g., during manufacturing, so that the respective EPID is unique to each user device. In some embodiments, the EPID private key may be stored in secure storage 130. In some embodiments, the EPID private key may be stored in TEE 128, in storage specific to TEE 128. In various embodiments, EPID private keys may be indistinguishable from other private keys, i.e., appears merely as a private key. Accordingly, signing communications with the EPID private key may not disclose personal information about a user or user device 112a.

In various embodiments, an EPID public key may be distributed, e.g., by an original equipment manufacturer ("OEM"), to verifying entities In some embodiments, the OEM may generate EPID key pairs and distribute them securely via a Certificate Authority (CA) service operated by the OEM. A single EPID public key may be configured to facilitate verification of multiple corresponding EPID private keys. The verifying entity may be able to determine that a particular private key is valid. However, in various embodiments, the verifying entity may not be able to identify which user device 112a provided the EPID private key. Accordingly, an identity of a user of user device 112a remains protected.

In an embodiment, user device 112a may be configured to connect to EP DHCP service 102 via a secure channel. CPA 140 may authenticate user device 112a to EP DHCP service 102. Various types of authentication and/or verification protocols may be used to facilitate secure provision of IP addresses between user device 112a and EP DHCP service 102. In various embodiments, these protocols may be used to prevent, among other things, man-in-the-middle attacks.

For example, the user device 112a and EP DHCP service 102 may be configured to establish a SIGMA channel to facilitate providing IP address to the user device over a secure channel. An example of the SIGMA protocol is described in more detail below with respect to FIG. 4. User device 112a may be configured to use an anonymous identifier, e.g. EPID, when establishing the secure channel with EP DHCP service 102.

User device 112a may be configured to connect to one or more web service(s) 110a, . . . , 110n using an IP address, e.g., EP IP address, provided by EP DHCP service 102. For example, user device 112a may be configured to participate in establishing a VPN (virtual private network) connecting the user device 112a to web service 110a. User device 112a may utilize the EP IP address acquired from the EP DHCP service 102 as its endpoint for the VPN. The VPN may be established using known protocols that include authentication. The VPN is configured to provide secure communication between the web service 110a and the user device 112a using known techniques including, e.g., cryptographic techniques.

Client privacy agent CPA 140 is configured to manage requesting an IP address from EP DHCP service 102, to monitor a number of connections established to external hosts, e.g. web service(s) 110a, . . . , 110m, using a received IP address and to monitor communication activity on the connection(s). CPA 140 may be configured to interact with context engine 142 to monitor activity that may affect user device 112a anonymity and/or user privacy. CPA 140 is further configured to determine one or more privacy score(s) 144, based at least in part, on results of monitoring. CPA 140 is configured to close a connection if a privacy score, e.g., device privacy score, reaches a predefined threshold.

CPA 140 may be configured to determine a device privacy score iteratively. For example, an initial privacy score may be determined that may be a default value and/or may be based, at least in part, on a DHCP service privacy policy. The privacy score may then be updated and/or replaced based, at least in part, on results of the monitoring and/or at predetermined time intervals. The monitoring is configured to capture, e.g., changes in DHCP policy, communications activity, number of connections and characteristics associated with the connections, unused IP address block size and/or contextual privacy score, as described herein.

Generally, a privacy score is a numerical indicator between zero and one, inclusive, corresponding to a likelihood that a user and/or user device may be identifiable. A privacy threshold is a predetermined numerical threshold that defines a boundary between acceptable likelihood of being identifiable and unacceptable likelihood of being identifiable. The privacy threshold may be based, at least in part, on user preference, user device owner preference (i.e. owner may or may not be the user), and/or context information. For example, for a privacy score configured such that a score of zero corresponds to anonymous and a score of one corresponds to identifiable, a privacy threshold based on user device owner (e.g., user's employer) preference may be in the range of $0.25 \times 10^{-6}$ (i.e. one in four million) to $0.33 \times 10^{-6}$ (i.e. one in three million). Similarly, a privacy threshold based on user preference may be in the range of $0.50 \times 10^{-6}$ (i.e., one in two million) to $1.00 \times 10^{-6}$ (one in one million). Thus, in these examples, a privacy score above the range may result in a connection being closed by the CPA 140 and a privacy score below the range may be allowed to continue.

Context engine 142 may be configured to monitor disclosure of context information associated with a user or the user device 112a that may be usable to identify or locate the user. Context information associated with a user may include context information associated with other user devices that may be utilized by the user. Context information may include but is not limited to personal information, activities, computing environments, relationships (e.g., with people, places or things), user devices including computing devices, physical environment, information captured from computing device sensors (or inferences drawn from that information), preferences, patterns of behavior, and/or any other information useful in identifying or understanding a user and his or her interests (collectively "context information"). Context engine 142 may be further configured to determine one or more contextual privacy score(s) based, at least in part, on the disclosure of context information. The contextual privacy score(s) may be based on a population size related to the context information. The contextual privacy score(s) may be further based, at least in part, on the specific context information disclosed, the entity disclosed to, whether the context information was disclosed to the same entity more than once, relative timing of the disclosure(s), etc. In some embodiments, the contextual privacy score(s) may be correlated with particular web service(s), e.g. one or more of web services 110a, . . . , 110m. The contextual privacy score(s) may be stored in privacy score storage 144 in, e.g., TEE 128.

CPA 140 is configured to determine an EP IP address privacy score based, at least in part, on activity associated with the EP IP address 136. The EP IP address privacy score may be determined based, at least in part, on a number of connections that have been made using the EP IP address, communication activity on the connections and/or the method that was used to acquire the EP IP address 136. For example, if the EP IP address was acquired using a secure channel (e.g., SIGMA) and an anonymous user device identifier (e.g., EPID) then a greater number of connections may be allowed using the EP IP address before the privacy threshold is reached as compared to an EP IP address acquired without using the secure channel and without using the anonymous device identifier. In some embodiments, the EP IP address privacy score may be based, at least in part, on a "trust level" (if any) associated with a particular web service, e.g., web service 110a. For example, fewer connections to a relatively untrusted web service(s) may be allowed using an EP IP address prior to acquiring a new EP IP address than connections to relatively trusted web service(s).

In some embodiments, the CPA 140 may be configured to determine a composite privacy score that includes contributions from contextual privacy score(s) determined by the context engine 142 and the EP IP address privacy score determined by the CPA 140. A device privacy score may then correspond to the composite privacy score. For example, the composite privacy score may be determined based on a weighted average of the contextual privacy score(s) and the EP IP address privacy score. In another example, the composite privacy score may be determined based on a combination of the contextual privacy score(s) and the EP IP address privacy score using known statistical methods.

Based on the device privacy score and the privacy policy 146, the CPA 140 may then allow a connection to continue or close a connection and initiate acquiring a new EP IP address. The privacy policy 146 may include privacy threshold(s) related to contextual information and/or connection data. Privacy threshold(s) may correspond to likelihood that an entity can correlate user personally identify information sufficient to identify the user and/or the user device 112a.

For example, if the device privacy score has reached a predetermined privacy threshold indicating that the user's and/or the user device's privacy is in jeopardy (i.e., that the user and/or the user device may be identifiable), the CPA 140 is configured to close the connection. The CPA 140 is further configured to initiate acquisition of a new EP IP address from, e.g., EP DHCP service 102, as described herein.

Thus, a system and method consistent with the present disclosure is configured to acquire an EP IP address, use the EP IP address for one or more connections to, e.g. web service(s), to close the connection(s) when a privacy threshold is reached thereby protecting user privacy.

Figure 2:
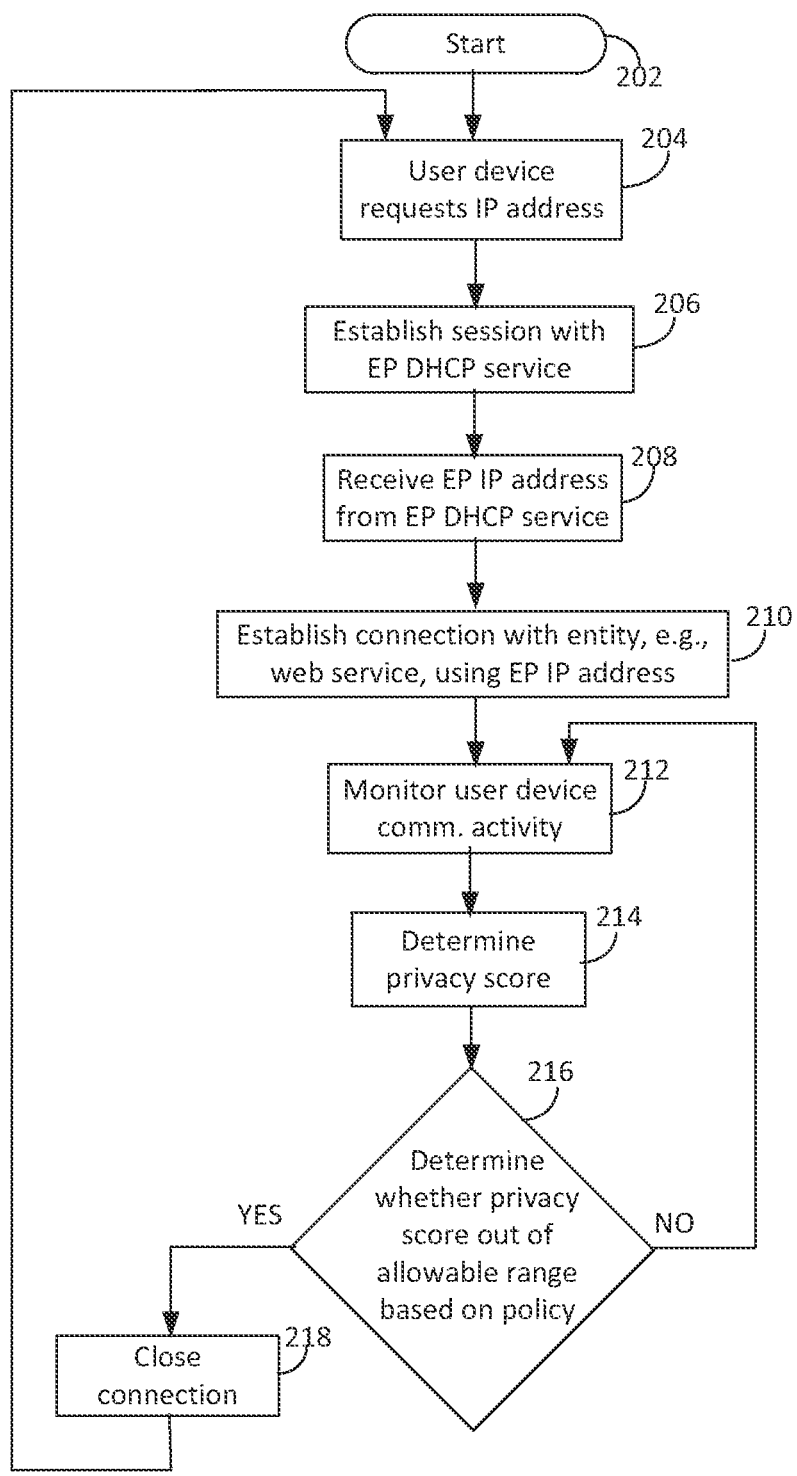
FIG. 2 illustrates a flowchart of exemplary operations of an EP DHCP service and a client privacy agent consistent with various embodiments of the present disclosure.

FIG. 2 illustrates an flowchart 200 of exemplary operations consistent with an embodiment of the present disclosure. The operations may be performed, for example, by user device 112a (including CPA 140) and/or EP DHCP service 102. In particular, flowchart 200 depicts exemplary operations configured to acquire an EP IP address, establish a connection with a web service and close the connection based, at least in part, on a privacy score.

Operations of flow chart 200 may begin with start 202. An IP address may be requested at operation 204. A session may be established with EP DHCP service at operation 206. For example, the session may be established using a secure channel, as described herein. An EP IP address may be received from EP DHCP service at operation 208. For example, the EP DHCP service is configured provide the EP IP address if an adequate number of unassigned IP (based on policy) addresses remain in the EP DHCP database. A connection with an entity, e.g. a web service may be established using the EP IP address at operation 210.

Operation 212 may include monitoring user device communication activity. For example, a client privacy agent may be configured to monitor user device communication activity. A privacy score may be determined at operation 214. For example, the client privacy agent may be configured to determine a device privacy score based, at least in part, on the device communication activity. The client privacy agent may be further configured to include contextual privacy scores based, at least in part on contextual information in its determination. Whether the privacy score is outside of an acceptable privacy range, based on policy, may be determined at operation 216. If the privacy score is not outside the acceptable privacy range, program flow may proceed to operation 212, monitoring user device communication activity. If the privacy score is outside the acceptable privacy range, the connection may be closed by, e.g., the client privacy agent, at operation 218. Program flow may then proceed to operation 204, requesting an EP IP address.

Thus, a privacy aware EP DHCP service consistent with the present disclosure is configured to provide an unassigned IP address to a requesting user device. The EP DHCP service is configured to avoid providing a specific IP address multiple times to a user device. The EP DHCP service may refuse a request for an IP address and/or may request additional IP addresses from an IP address authority if the number of unassigned addresses goes below a threshold, e.g., a fraction of the number, M, of IP addresses.

The client privacy agent is configured to monitor the communication activity (including, e.g., the number of connections) associated with the IP address, to receive contextual privacy score(s) from the context engine related to other activities of the user device and to iteratively determine a device privacy score based, at least in part, on the monitoring. The CPA is further configured to close a connection if the privacy score (i.e., device privacy score) reaches a predefined threshold. In this manner, user privacy may be protected from undesired identification by entities such as e-commerce web sites.

Figure 3:
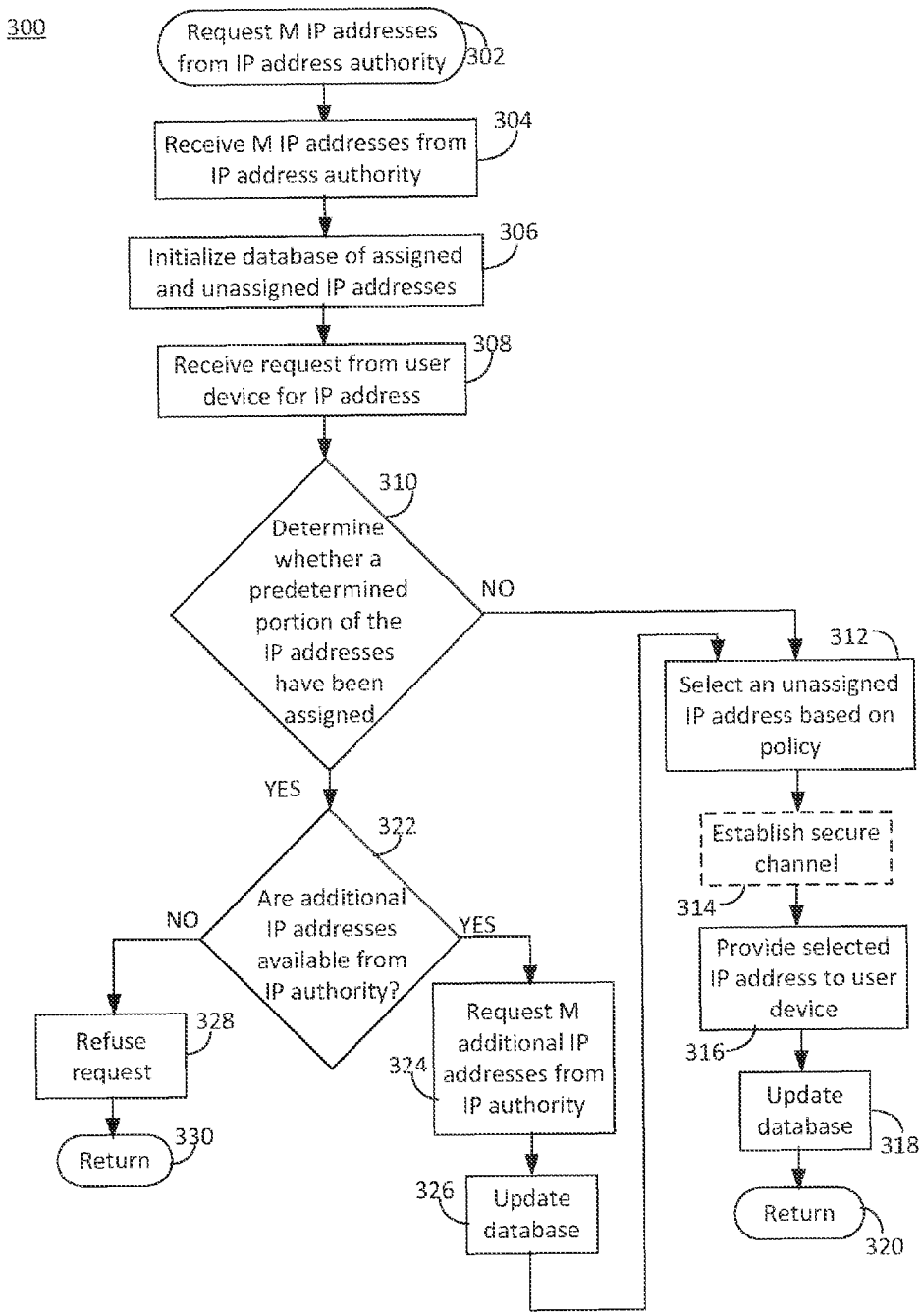
FIG. 3 illustrates a flowchart of exemplary operations for a privacy aware EP DHCP service consistent with various embodiments of the present disclosure.

FIG. 3 illustrates an flowchart 300 of exemplary operations consistent with an embodiment of the present disclosure. The operations may be performed, for example, by EP DHCP service 102 and IP address application 162. In particular, flowchart 300 depicts exemplary operations of the EP DHCP service configured to acquire blocks of IP addresses from an IP address authority, to ensure an adequate number of unassigned IP addresses is available and to provide an EP IP address to, e.g., a user device while ensuring that a particular EP IP address is not provided to the same user device more than once.

The operations of flow chart 300 may begin at operation 302 that includes requesting M IP addresses from an IP address authority. The M IP addresses may be received at operation 304. Operation 306 includes initializing an IP address database of assigned and unassigned addresses. After the initializing, the IP address database is configured to include M unassigned IP addresses. A request from a user device for an IP address may be received at operation 308.

Operation 310 may include determining whether a predetermined portion of the IP addresses in the database has been assigned. For example, the portion may be one half of M. If the predetermined portion has not been assigned, an unassigned IP address may be selected based on policy at operation 312. For example, policy may include ensuring that an IP address is not assigned to a user device more than once. In another example, policy may include selecting the IP address randomly from the unassigned IP addresses.

In some embodiments, a secure channel between the EP DHCP service and the user device may be established at operation 314. For example, the secure channel may be established according to the SIGMA protocol, as described herein.

The selected IP address may be provided to the user device at operation 316. The IP address database may be updated at operation 318. For example, the update may be configured to indicate that the selected IP address has been provided to the user device. If the user device utilized an EPID for communication with the EP DHCP service, then the update may relate the IP address to the EPID without further identifying the user device. Program flow may return at operation 320.

If the predetermined portion has been assigned, whether additional IP addresses are available from the IP address authority may be determined at operation 322. If additional IP addresses are available, a number, e.g., M, additional IP addresses may be requested from the IP address authority at operation 324. Operation 326 may include updating the IP address database with the additional IP addresses. Program flow may then proceed to operation 312, selecting an unassigned IP address based on policy.

If additional IP addresses are not available from the IP authority, the request for an IP address from the user device may be refused at operation 328. Program flow may then return at operation 330.

Thus, an EP DHCP service may request blocks of IP addresses from an IP authority for provision to requesting user devices. The EP DHCP service is configured to maintain a database of assigned and unassigned IP addresses and to replenish the database when a predetermined portion of the IP addresses have been assigned. The EP DHCP service is further configured to avoid providing the same IP address to a user device more than once. In this manner, user and user device privacy may be protected from attempts by one or more entities to correlate a user device IP address with other personally identifiable information.

Figure 4:
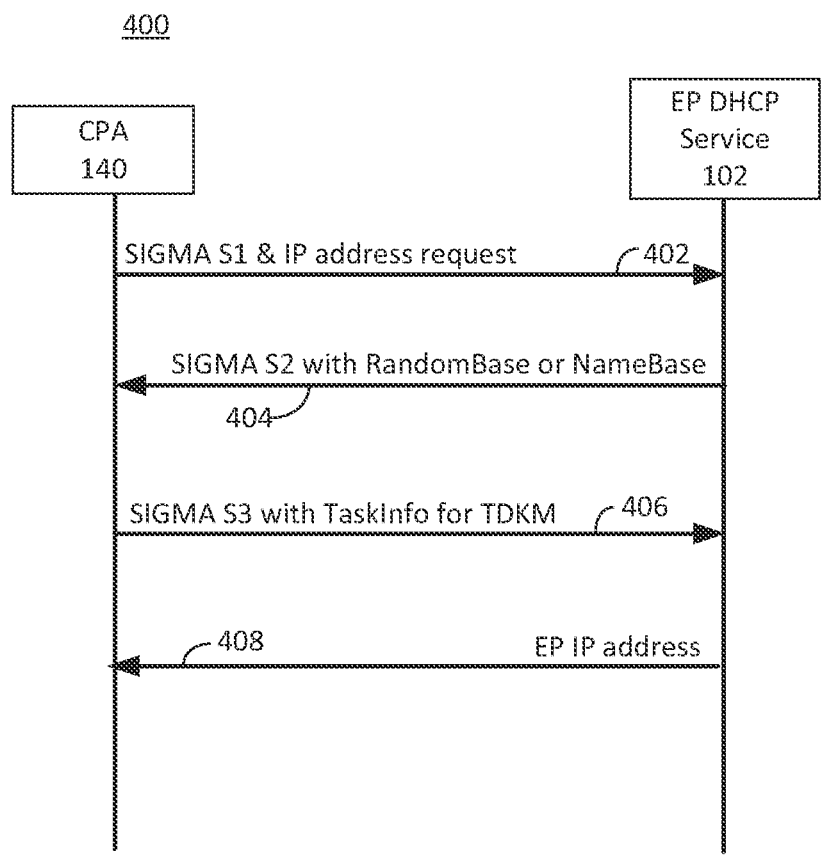
FIG. 4 illustrates an exemplary SIGMA protocol consistent with various embodiments of the present disclosure.

FIG. 4 depicts one example exchange 400 between CPA 140 and EP DHCP service 102 configured to facilitate secure provision of IP addresses from EP DHCP service 102 to user device 112a. This is an example of a "SIGMA" (SIGn and MAc (Message Authentication code)) key exchange protocol. In this example, a client endpoint may terminate in TEE 128. In some embodiments, exchange 400 may be implemented using a signed Diffie-Hellman protocol. In other embodiments, other exchange protocols may be used.

At arrow 402, CPA 140 may request an IP address from EP DHCP service 102 and may provide a SIGMA S1 message with the request. In some embodiments, the SIGMA S1 message may be signed, e.g., by user device 112a, using its EPID private key. For example, in some embodiments, CPA 140, acting as a "prover", may choose a random value, a, as its ephemeral Diffie-Hellman ("DH") key. CPA 140 may then compute $g^a$ as its ephemeral DH public key. CPA 140 may send a Group ID of its current EPID key and $g^a$ to the verifier (DHCP service, in this example). The Group ID corresponds to a public key associated with the EPID key (private key). In some embodiments. CPA 140 may also append an Online Certificate Status Protocol ("OCSP") Request, configured to certify the Group ID.

At arrow 404, EP DHCP service 102 may provide, e.g., to CPA 140, a SIGMA S2 message that may be generated using a random-base identifier. In some embodiments, the SIGMA S2 message may include a named base where the EP DHCP service is named. This may allow the CPA 140 to enforce a policy of only operating with the named DHCP service provider and ensures that the DHCP service provider can detect and revoke compromised CPA TEE endpoints.

For example, in some embodiments, EP DHCP service 102 may generate and transmit a SIGMA S2 message in accordance with the following:
1) EP DHCP service 102 may select a random value, b, as its ephemeral DH private key:
2) EP DHCP service 102 may compute $g^b$ as its ephemeral DH public key;
3) EP DHCP service 102 may compute $g^{ab}=(g^a)^b$;
4) EP DHCP service 102 may derive a secrecy MACing key ("SMK"), a secrecy key ("SK") and a MACing key ("MK");
5) EP DHCP service 102 may then determine SIG-RL corresponding to the Group ID of user device 112a;
6) EP DHCP service 102 may select a basename for the protocol corresponding to the EP DHCP service, or it may set the basename to 0x00 for random-based signatures;
7) EP DHCP service 102 may compute the MAC of SIG-RL, basename, OCSPReq, OCSP response(s), and $Cert_{ver}$ using the SMK;
8) EP DHCP service 102 may sign ($g^a\|g^b$) using its signing key to produce $Sig(g^a\|g^b)$;
9) EP DHCP service 102 may request n OCSP Responses from one or more OCSP responder servers, e.g., using an OCSP nonce exchanged in the S1 message. In some cases, n may be the number of certificates in the DHCP service's certification chain. In some cases, the n OCSP responses may cover the n certificates in the Verifier certificate chain. In some embodiments. EP DHCP service 102 may wait for an OCSP response from CPA 140, and may verify the response upon receipt
10) EP DHCP service 102 may send to CPA 140 the following: [$g^b$, BaseName. OCSPReq, $Cert_{ver}$, SIG-RL, OCSPResp]$_{SMK}$, and $Sig(g^a\|g^b)$.

In various embodiments, CPA 140 may verify the received SIGMA S2 message. In some embodiments, CPA 140 may verify this data using operations similar to the following:
1) CPA 140 may compute $g^{ab}=(g^b)^a$;
2) CPA 140 may derive SMK, SK and MK, as described above;
3) CPA 140 may verify the first certificate in the $Cert_{ver}$ chain using a verification key, e.g. an Intel Verification Key ("IVK") installed during manufacturing, e.g., by Intel Corporation of Santa Clara, Calif.;
4) CPA 140 may verify the MAC of BaseName, OCSPReq, $Cert_{ver}$, SIG-RL, and OCSPResp (if any) using SMK:
5) CPA 140 may verify the n OCSP Responses (if indicated)
 a. If CPA 140 is using the OCSP Response for provisioning a trusted time, the response may be non-cached and returned within, e.g. two minutes of sending the S1 message. If there are multiple OCSP Responses, a ProducedAt time stamp of the first OCSP Response received by CPA 140 may be used as trusted time, b. If CPA 140 is accepting non-cached responses, the timestamp in the response may be less than, e.g., one day old;

6) CPA 140 may verify the signature of $(g^a\|g^b)$ using the verifier's public key in $Cert_{ver}$.

After verifying the EP DHCP service certificate, at arrow 406, CPA 140 may generate and provide, e.g., to EP DHCP service 102, a SIGMA S3 message. In various embodiments, the SIGMA S3 message may include information describing a software and/or hardware configuration of TEE 128, including in some cases the ability of the TEE 128 to support IP address provisioning. For example, in some embodiments, CPA 140 may generate and provide, e.g. to EP DHCP service 102, the SIGMA S3 message in accordance with the following:

1) CPA 140 may compute a MAC of the entire S3 message using SMK, e.g., to produce $[TaskInfo\|g^a\|EPIDCert_{prv}\|EPIDSig(g^a\|g^b)]_{SMK}$;
2) CPA 140 may use its current EPID key and BaseName to sign $(g^a\|g^b)$, e.g., to produce $EPID\text{-}Sig(g^a\|g^b)$:

The EPID signature may include the non-revoked proofs based on SIG-RL.

3) CPA 140 may send $[TaskInfo\|g^a\|EPIDCert_{prv}\|EPIDSig(g^a\|g^b)]_{SMK}$ to EP DHCP service 102.

In various embodiments, EP DHCP service 102 may use the SIGMA S3 message to determine whether TEE 128 is intact. For example, in various embodiments, EP DHCP service 102 may verify the SIGMA S3 message in accordance with the following:

1) EP DHCP service 102 may verify $[TaskInfo\|g^a\|EPIDCertp\|EPIDSig(g^a\|g^b)]_{SMK}$ using SMK;
2) EP DHCP service 102 may verify $g^a$ is the same that arrived in the SIGMA S1 message;
3) EP DHCP service 102 may verify the EPID group certificate $Cert_{prv}$ using IVK;
4) EP DHCP service 102 may verify the EPID signature of $(g^a\|g^b)$ including the revocation check;
5) EP DHCP service 102 may verify the TaskInfo structure, which may not be required for all verifiers.

At arrow 408, EP DHCP service 102 may provide the EP IP address to user device 112a and CPA 140. The EP IP address may be selected according to policy, as described herein.

Thus, FIG. 4 illustrates an example of an exchange between a client privacy agent and an EP DHCP service configured to provide a secure channel for providing an IP address to a requesting user device. The illustrated example further includes preserving user device anonymity by using an EPID, as described herein.

While FIGS. 2 and 3 illustrate various operations according one embodiment, it is to be understood that not all of the operations depicted in FIGS. 2 and 3 are necessary for other embodiments. Indeed, it is fully contemplated herein that in other embodiments of the present disclosure, the operations depicted in FIGS. 2 and 3 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Any of the operations described herein may be implemented in a system that includes one or more storage mediums having stored thereon, individually or in combination, instructions that when executed by one or more processors perform the methods. Here, the processor may include, for example, a server CPU and/or other programmable circuitry.

Also, it is intended that operations described herein may be distributed across a plurality of physical devices, such as processing structures at more than one different physical locations. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories. Solid State Disks (SSDs), magnetic or optical cards, or any type of media suitable for storing electronic instructions. Other embodiments may be implemented as software modules executed by a programmable control device. The storage medium may be non-transitory.

User devices 112a, ..., 112n may be configured to communicate with network 108, EP DHCP service 102 and/or additional DHCP services 103a, ..., 103m using a variety of communication protocols. The communications protocols may include but are not limited to wireless communications protocols, such as Wi-Fi, 3G, 4G and/or other communication protocols. The Wi-Fi protocol may comply or be compatible with the 802.11 standards published by the Institute of Electrical and Electronics Engineers (IEEE), titled "IEEE 802.11-2007 Standard. IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications" published, Mar. 8, 2007, and/or later versions of this standard.

The 3G protocol may comply or be compatible with the International Mobile Telecommunications (IMT) standard published by the International Telecommunication Union (ITU), titled "IMT-2000", published in 2000, and/or later versions of this standard. The 4G protocol may comply or be compatible with IMT standard published by the ITU, titled "IMT-Advanced", published in 2008, and/or later versions of this standard.

For example, network 108 may comprise a packet switched network. User devices 112a, ..., 112n may be configured to communicate with EP DHCP service 102 and/or additional DHCP services 103a, ..., 103m using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternatively or additionally, user devices 112a, ..., 112n may be configured to communicate with EP DHCP service 102 and/or additional DHCP services 103a, ..., 103m, using an X.25 communications protocol. The X.25 communications protocol may comply or be compatible with a standard promulgated by the International Telecommunication Union-Telecommunication Standardization Sector (ITU-T). Alternatively or additionally, user devices 112a, ..., 112n may be configured to communicate with EP DHCP service 102 and/or additional DHCP services 103a, ..., 103m, using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, user devices 112a, . . . , 112n may be configured to communicate with EP DHCP service 102 and/or additional DHCP services 103a, . . . , 103m, using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed connection-oriented network communication protocols are equally contemplated herein.

The trusted execution environment TEE 128 is configured to provide a trusted execution and storage environment. TEE 128 may comply or be compatible with the Trusted Platform Module standard, published July 2007 by JTC1, a joint committee of the International Organization for Standardization (ISO), and IEC, the International Electrotechnical Commission, entitled the "Trusted Computing Group Trusted Platform Module specification Version 1.2" as ISO/IEC standard 11889, and/or later versions of this standard.

As used in any embodiment herein, the term "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Thus, the present disclosure provides an apparatus, method and system configured to enhance user privacy for communication that utilizes IPv6 by exploiting the size of the IPv6 address space. The method and system include a privacy aware EP DHCP service configured to provide a previously unassigned IP address to a user device and a CPA executing in a trusted execution environment in the user device. The EP DHCP service is configured to acquire a relatively large number of IPv6 addresses from an IP address authority and to avoid providing the same IP address to a user device more than once. The user device is configured to utilize the assigned IP address to establish a connection for communication over a network with an entity. e.g., a web service.

The CPA is configured to monitor the number of connections that utilize the assigned IP address as well as communication activity on the connection(s). The CPA is further configured to determine a privacy score (e.g., device privacy score) based, at least in part, on the communication activity and to cause the connection to be closed if the privacy score reaches a predefined privacy threshold. In some embodiments, the privacy score may be a composite score that includes individual privacy scores associated with other user device activities, e.g. related to context information, as described herein. By utilizing unique addresses selected from a sufficiently large database of IP addresses and closing connections when a privacy threshold is reached, entities including, but not limited to, network operators, ISPs and e-commerce exchange operators may be prevented from building a database of personally identifiable information of a user that ultimately identifies the user and/or the user device.

According to one aspect there is provided a user device. The user device may include a trusted execution environment including a client privacy agent configured to request a first Internet Protocol (IP) address from a Dynamic Host Configuration Protocol (DHCP) service and to determine a device privacy score based, at least in part, on a DHCP policy of the DHCP service; memory comprising secure storage, the secure storage configured to store the first IP address received from the DHCP service; and communication circuitry configured to establish at least one connection between the user device and at least one entity over a network using the first IP address, the client privacy agent further configured to monitor communication activity over the at least one connection, to update the device privacy score based, at least in part, on the communication activity, and to close the at least one connection if the device privacy score is outside an acceptable privacy score range, the acceptable privacy range bounded by a privacy threshold.

Another example apparatus includes the forgoing components and the client privacy agent is configured to update the device privacy score based, at least in part, on a number of connections established using the first IP address.

Another example apparatus includes the forgoing components and the trusted execution environment further comprises a context engine configured to determine a contextual privacy score, the contextual privacy score based on context information related to at least one of a user and the user device, and the device privacy score is further based, at least in part, on the contextual privacy score.

Another example apparatus includes the forgoing components and the client privacy agent is configured to establish a secure communication channel between the user device and the DHCP service, the secure communication channel implemented using cryptographic techniques.

Another example apparatus includes the forgoing components and the client privacy agent is configured to select the DHCP service from a plurality of DHCP services, the selection based on a respective DHCP policy of each DHCP service.

According to another aspect there is provided a system. The system may include a Dynamic Host Configuration Protocol (DHCP) service configured to store a number, M, of Internet Protocol (IP) addresses and a user device. The user device may include a trusted execution environment including a client privacy agent configured to request a first Internet Protocol (IP) address from the Dynamic Host Configuration Protocol (DHCP) service and to determine a device privacy score based, at least in part, on a DHCP policy of the DHCP service: memory comprising secure storage, the secure storage configured to store the first IP address received from the DHCP service; and communication circuitry configured to establish at least one connection between the user device and at least one entity over a network using the first IP address, the client privacy agent further configured to monitor communication activity over the at least one connection, to update the device privacy score based, at least in part, on the communication activity, and to close the at least one connection if the device privacy score is outside an acceptable privacy score range, the acceptable privacy range bounded by a privacy threshold.

Another example system includes the forgoing components and the client privacy agent is configured to update the device privacy score based, at least in part, on a number of connections established using the first IP address.

Another example system includes the forgoing components and the trusted execution environment further comprises a context engine configured to determine a contextual privacy score, the contextual privacy score based on context information related to at least one of a user and the user device, and the device privacy score is further based, at least in part, on the contextual privacy score.

Another example system includes the forgoing components and the client privacy agent is configured to establish a secure communication channel between the user device and the DHCP service, the secure communication channel implemented using cryptographic techniques.

Another example system includes the forgoing components and the DHCP service is configured to request an additional block of IP addresses from an IP address authority if a number of assigned IP addresses exceeds a predefined fraction of M.

Another example system includes the forgoing components and the client privacy agent is configured to select the DHCP service from a plurality of DHCP services, the selection based on a respective DHCP policy of each DHCP service.

Another example system includes the forgoing components and the entity is one of a web service, a network operator, an internet service provider and an e-commerce exchange provider.

According to another aspect there is provided a method. The method may include receiving, by a user device, a first Internet Protocol (IP) address from a Dynamic Host Configuration Protocol (DHCP) service, the DHCP service configured to store a number, M, of IP addresses; establishing at least one connection between the user device and at least one entity over a network using the first IP address; monitoring, by the user device, communication activity over the at least one connection; determining a device privacy score, by the user device, the device privacy score based at least in part, on the communication activity; and closing the at least one connection if the device privacy score is outside an acceptable privacy score range, the acceptable privacy range bounded by a privacy threshold.

Another example method includes the forgoing operations and further includes updating the device privacy score based, at least in part, on a number of connections.

Another example method includes the forgoing operations and further includes establishing a secure communication channel between the user device and the DHCP service, the secure communication channel implemented using cryptographic techniques.

Another example method includes the forgoing operations and further includes requesting, by a DHCP service, an additional block of IP addresses from an IP address authority if a number of assigned IP addresses exceeds a predefined fraction of M.

Another example method includes the forgoing operations and further includes acquiring a contextual privacy score from a context engine, the contextual privacy score based on context information related to at least one of a user and the user device, the device privacy score further based, at least in part, on the contextual privacy score.

Another example method includes the forgoing operations and further includes selecting the DHCP service from a plurality of DHCP services, the selection based on a respective DHCP policy of each DHCP service.

Another example method includes the forgoing operations and further includes that the entity is one of a web service, a network operator, an internet service provider and an e-commerce exchange provider.

According to another aspect there is provided a system. The system may include one or more storage mediums having stored thereon, individually or in combination, instructions that when executed by one or more processors result in the following operations comprising: receiving, by a user device, a first Internet Protocol (IP) address from a Dynamic Host Configuration Protocol (DHCP) service, the DHCP service configured to store a number, M, of IP addresses; establishing at least one connection between the user device and at least one entity over a network using the first IP address; monitoring, by the user device, communication activity over the at least one connection; determining a device privacy score, by the user device, the device privacy score based at least in part, on the communication activity; and closing the at least one connection if the device privacy score is outside an acceptable privacy score range, the acceptable privacy range bounded by a privacy threshold.

Another example system includes instructions that when executed by one or more processors result in the forgoing operations and also includes updating the device privacy score based, at least in part, on a number of connections.

Another example system includes instructions that when executed by one or more processors result in the forgoing operations and also includes establishing a secure communication channel between the user device and the DHCP service, the secure communication channel implemented using cryptographic techniques.

Another example system includes instructions that when executed by one or more processors result in the forgoing operations and also includes requesting, by a DHCP service, an additional block of IP addresses from an IP address authority if a number of assigned IP addresses exceeds a predefined fraction of M.

Another example system includes instructions that when executed by one or more processors result in the forgoing operations and also includes acquiring a contextual privacy score from a context engine, the contextual privacy score based on context information related to at least one of a user and the user device, the device privacy score further based, at least in part, on the contextual privacy score.

Another example system includes instructions that when executed by one or more processors result in the forgoing operations and also includes selecting the DHCP service from a plurality of DHCP services, the selection based on a respective DHCP policy of each DHCP service.

Another example system includes instructions that when executed by one or more processors result in the forgoing operations and also includes that the entity is one of a web service, a network operator, an internet service provider and an e-commerce exchange provider.

According to one aspect there is provided a user device. The user device may include a trusted execution environment comprising a client privacy agent configured to request a first Internet Protocol (IP) address from a Dynamic Host Configuration Protocol (DHCP) service and to determine a device privacy score based, at least in part, on a DHCP policy of the DHCP service; memory comprising secure storage, the secure storage configured to store the first IP address received from the DHCP service; and communication circuitry configured to establish at least one connection between the user device and at least one entity over a network using the first IP address, the client privacy agent further configured to monitor communication activity over the at least one connection, to update the device privacy score based, at least in part, on the communication activity, and to close the at least one connection if the device privacy score is outside an acceptable privacy score range, the acceptable privacy range bounded by a privacy threshold.

Another example apparatus includes the forgoing components and the client privacy agent is configured to update the device privacy score based, at least in part, on a number of connections established using the first IP address.

Another example apparatus includes the forgoing components and the trusted execution environment further comprises a context engine configured to determine a contextual privacy score, the contextual privacy score based on context information related to at least one of a user and the user device, and the device privacy score is further based, at least in part, on the contextual privacy score.

Another example apparatus includes the forgoing components and the client privacy agent is configured to establish a secure communication channel between the user device and the DHCP service, the secure communication channel implemented using cryptographic techniques.

According to another aspect there is provided a system. The system may include a Dynamic Host Configuration Protocol (DHCP) service configured to store a number, M, of Internet Protocol (IP) addresses; and a user device. The user device may include a trusted execution environment comprising a client privacy agent configured to request a first Internet Protocol (IP) address from the DHCP service and to determine a device privacy score based, at least in part, on a DHCP policy of the DHCP service, memory comprising secure storage, the secure storage configured to store the first IP address received from the DHCP service, and communication circuitry configured to establish at least one connection between the user device and at least one entity over a network using the first IP address, the client privacy agent further configured to monitor communication activity over the at least one connection, to update the device privacy score based, at least in part, on the communication activity, and to close the at least one connection if the device privacy score is outside an acceptable privacy score range, the acceptable privacy range bounded by a privacy threshold.

Another example system includes the forgoing components and the client privacy agent is configured to update the device privacy score based, at least in part, on a number of connections established using the first IP address.

Another example system includes the forgoing components and the trusted execution environment further comprises a context engine configured to determine a contextual privacy score, the contextual privacy score based on context information related to at least one of a user and the user device, and the device privacy score is further based, at least in part, on the contextual privacy score.

Another example system includes the forgoing components and the client privacy agent is configured to establish a secure communication channel between the user device and the DHCP service, the secure communication channel implemented using cryptographic techniques.

Another example system includes the forgoing components and the DHCP service is configured to request an additional block of IP addresses from an IP address authority if a number of assigned IP addresses exceeds a predefined fraction of M.

Another example system includes the forgoing components and the client privacy agent is configured to select the DHCP service from a plurality of DHCP services, the selection based on a respective DHCP policy of each DHCP service.

According to another aspect there is provided a method. The method may include receiving, by a user device, a first Internet Protocol (IP) address from a Dynamic host Configuration Protocol (DHCP) service, the DHCP service configured to store a number, M, of IP addresses; establishing at least one connection between the user device and at least one entity over a network using the first IP address; monitoring, by the user device, communication activity over the at least one connection; determining a device privacy score, by the user device, the device privacy score based at least in part, on the communication activity; and closing the at least one connection if the device privacy score is outside an acceptable privacy score range, the acceptable privacy range bounded by a privacy threshold.

Another example method includes the forgoing operations and further includes updating the device privacy score based, at least in part, on a number of connections.

Another example method includes the forgoing operations and further includes establishing a secure communication channel between the user device and the DHCP service, the secure communication channel implemented using cryptographic techniques.

Another example method includes the forgoing operations and further includes requesting, by a DHCP service, an additional block of IP addresses from an IP address authority if a number of assigned IP addresses exceeds a predefined fraction of M.

Another example method includes the forgoing operations and further includes acquiring a contextual privacy score from a context engine, the contextual privacy score based on context information related to at least one of a user and the user device, the device privacy score further based, at least in part, on the contextual privacy score.

Another example method includes the forgoing operations and further includes selecting the DHCP service from a plurality of DHCP services, the selection based on a respective DHCP policy of each DHCP service.

According to another aspect there is provided a system. The system may include one or more storage mediums having stored thereon, individually or in combination, instructions that when executed by one or more processors result in the following operations comprising: receiving, by a user device, a first Internet Protocol (IP) address from a Dynamic Host Configuration Protocol (DHCP) service, the DHCP service configured to store a number, M, of IP addresses; establishing at least one connection between the user device and at least one entity over a network using the first IP address; monitoring, by the user device, communication activity over the at least one connection; determining a device privacy score, by the user device, the device privacy score based at least in part, on the communication activity; and closing the at least one connection if the device privacy score is outside an acceptable privacy score range, the acceptable privacy range bounded by a privacy threshold.

Another example system includes instructions that when executed by one or more processors result in the forgoing operations and also includes updating the device privacy score based, at least in part, on a number of connections.

Another example system includes instructions that when executed by one or more processors result in the forgoing operations and also includes establishing a secure communication channel between the user device and the DHCP service, the secure communication channel implemented using cryptographic techniques.

Another example system includes instructions that when executed by one or more processors result in the forgoing operations and also includes requesting, by a DHCP service, an additional block of IP addresses from an IP address authority if a number of assigned IP addresses exceeds a predefined fraction of M.

Another example system includes instructions that when executed by one or more processors result in the forgoing operations and also includes acquiring a contextual privacy score from a context engine, the contextual privacy score based on context information related to at least one of a user and the user device, the device privacy score further based, at least in part, on the contextual privacy score.

Another example system includes instructions that when executed by one or more processors result in the forgoing operations and also includes selecting the DHCP service from a plurality of DHCP services, the selection based on a respective DHCP policy of each DHCP service.

According to one aspect there is provided a user device. The user device may include a trusted execution environment comprising a client privacy agent configured to request a first Internet Protocol (IP) address from a Dynamic Host Configuration Protocol (DHCP) service and to determine a device privacy score based, at least in part, on a DHCP policy of the DHCP service; memory comprising secure storage, the secure storage configured to store the first IP address received from the DHCP service; and communication circuitry configured to establish at least one connection between the user device and at least one entity over a network using the first IP address, the client privacy agent further configured to monitor communication activity over the at least one connection, to update the device privacy score based, at least in part, on the communication activity, and to close the at least one connection if the device privacy score is outside an acceptable privacy score range, the acceptable privacy range bounded by a privacy threshold.

Another example apparatus includes the forgoing components and the client privacy agent is configured to update the device privacy score based, at least in part, on a number of connections established using the first IP address.

Another example apparatus includes the forgoing components and the trusted execution environment further comprises a context engine configured to determine a contextual privacy score, the contextual privacy score based on context information related to at least one of a user and the user device, and the device privacy score is further based, at least in part, on the contextual privacy score.

Another example apparatus includes the forgoing components and the client privacy agent is configured to select the DHCP service from a plurality of DHCP services, the selection based on a respective DHCP policy of each DHCP service.

According to another aspect there is provided a system. The system may include a Dynamic Host Configuration Protocol (DHCP) service configured to store a number, M, of Internet Protocol (IP) addresses; and a user device. The user device may include a trusted execution environment comprising a client privacy agent configured to request a first Internet Protocol (IP) address from the DHCP service and to determine a device privacy score based, at least in part, on a DHCP policy of the DHCP service, memory comprising secure storage, the secure storage configured to store the first IP address received from the DHCP service, and communication circuitry configured to establish at least one connection between the user device and at least one entity over a network using the first IP address, the client privacy agent further configured to monitor communication activity over the at least one connection, to update the device privacy score based, at least in part, on the communication activity, and to close the at least one connection if the device privacy score is outside an acceptable privacy score range, the acceptable privacy range bounded by a privacy threshold.

Another example system includes the forgoing components and the client privacy agent is configured to update the device privacy score based, at least in part, on a number of connections established using the first IP address.

Another example system includes the forgoing components and the trusted execution environment further comprises a context engine configured to determine a contextual privacy score, the contextual privacy score based on context information related to at least one of a user and the user device, and the device privacy score is further based, at least in part, on the contextual privacy score.

Another example system includes the forgoing components and the client privacy agent is configured to establish a secure communication channel between the user device and the DHCP service, the secure communication channel implemented using cryptographic techniques.

Another example system includes the forgoing components and the DHCP service is configured to request an additional block of IP addresses from an IP address authority if a number of assigned IP addresses exceeds a predefined fraction of M.

According to another aspect there is provided a method. The method may include receiving, by a user device, a first Internet Protocol (IP) address from a Dynamic Host Configuration Protocol (DHCP) service, the DHCP service configured to store a number, M, of IP addresses; establishing at least one connection between the user device and at least one entity over a network using the first IP address; monitoring, by the user device, communication activity over the at least one connection; determining a device privacy score, by the user device, the device privacy score based at least in part, on the communication activity; and closing the at least one connection if the device privacy score is outside an acceptable privacy score range, the acceptable privacy range bounded by a privacy threshold.

Another example method includes the forgoing operations and further includes updating the device privacy score based, at least in part, on a number of connections.

Another example method includes the forgoing operations and further includes acquiring a contextual privacy score from a context engine, the contextual privacy score based on context information related to at least one of a user and the user device, the device privacy score further based, at least in part, on the contextual privacy score.

Another example method includes the forgoing operations and further includes establishing a secure communication channel between the user device and the DHCP service, the secure communication channel implemented using cryptographic techniques.

Another example method includes the forgoing operations and further includes requesting, by a DHCP service, an additional block of IP addresses from an IP address authority if a number of assigned IP addresses exceeds a predefined fraction of M.

Another example method includes the forgoing operations and further includes selecting the DHCP service from a plurality of DHCP services, the selection based on a respective DHCP policy of each DHCP service.

According to one aspect there is provided a user device. The user device may include a trusted execution environment comprising a client privacy agent configured to request a first Internet Protocol (IP) address from a Dynamic Host Configuration Protocol (DHCP) service and to determine a device privacy score based, at least in part, on a DHCP policy of the DHCP service; memory comprising secure storage, the secure storage configured to store the first IP address received from the DHCP service; and communication circuitry configured to establish at least one connection between the user device and at least one entity over a network using the first IP address, the client privacy agent further configured to monitor communication activity over the at least one connection, to update the device privacy score based, at least in part, on the communication activity, and to close the at least one connection if the device privacy score is outside an acceptable privacy score range, the acceptable privacy range bounded by a privacy threshold.

Another example apparatus includes the forgoing components and the client privacy agent is configured to update the device privacy score based, at least in part, on a number of connections established using the first IP address.

Another example apparatus includes the forgoing components and the trusted execution environment further comprises a context engine configured to determine a contextual privacy score, the contextual privacy score based on context information related to at least one of a user and the user device, and the device privacy score is further based, at least in part, on the contextual privacy score.

Another example apparatus includes the forgoing components and the client privacy agent is configured to establish a secure communication channel between the user device and the DHCP service, the secure communication channel implemented using cryptographic techniques.

According to another aspect there is provided a system. The system may include a Dynamic Host Configuration Protocol (DHCP) service configured to store a number, M, of Internet Protocol (IP) addresses; and a user device. The user device may include
a trusted execution environment comprising a client privacy agent configured to request a first Internet Protocol (IP) address from the DHCP service and to determine a device privacy score based, at least in part, on a DHCP policy of the DHCP service, memory comprising secure storage, the secure storage configured to store the first IP address received from the DHCP service, and communication circuitry configured to establish at least one connection between the user device and at least one entity over a network using the first IP address, the client privacy agent further configured to monitor communication activity over the at least one connection, to update the device privacy score based, at least in part, on the communication activity, and to close the at least one connection if the device privacy score is outside an acceptable privacy score range, the acceptable privacy range bounded by a privacy threshold.

Another example system includes the forgoing components and the client privacy agent is configured to update the device privacy score based, at least in part, on a number of connections established using the first IP address.

Another example system includes the forgoing components and the trusted execution environment further comprises a context engine configured to determine a contextual privacy score, the contextual privacy score based on context information related to at least one of a user and the user device, and the device privacy score is further based, at least in part, on the contextual privacy score.

Another example system includes the forgoing components and the client privacy agent is configured to establish a secure communication channel between the user device and the DHCP service, the secure communication channel implemented using cryptographic techniques.

Another example system includes the forgoing components and the DHCP service is configured to request an additional block of IP addresses from an IP address authority if a number of assigned IP addresses exceeds a predefined fraction of M.

Another example system includes the forgoing components and the client privacy agent is configured to select the DHCP service from a plurality of DHCP services, the selection based on a respective DHCP policy of each DHCP service.

According to another aspect there is provided a method. The method may include receiving, by a user device, a first Internet Protocol (IP) address from a Dynamic Host Configuration Protocol (DHCP) service, the DHCP service configured to store a number, M, of IP addresses; establishing at least one connection between the user device and at least one entity over a network using the first IP address; monitoring, by the user device, communication activity over the at least one connection; determining a device privacy score, by the user device, the device privacy score based at least in part, on the communication activity; and closing the at least one connection if the device privacy score is outside an acceptable privacy score range, the acceptable privacy range bounded by a privacy threshold.

Another example method includes the forgoing operations and further includes updating the device privacy score based, at least in part, on a number of connections.

Another example method includes the forgoing operations and further includes establishing a secure communication channel between the user device and the DHCP service, the secure communication channel implemented using cryptographic techniques.

Another example method includes the forgoing operations and further includes requesting, by a DHCP service, an additional block of IP addresses from an IP address authority if a number of assigned IP addresses exceeds a predefined fraction of M.

Another example method includes the forgoing operations and further includes acquiring a contextual privacy score from a context engine, the contextual privacy score based on context information related to at least one of a user and the user device, the device privacy score further based, at least in part, on the contextual privacy score.

Another example method includes the forgoing operations and further includes selecting the DHCP service from a plurality of DHCP services, the selection based on a respective DHCP policy of each DHCP service.

According to another aspect there is provided a system. The system may include means for receiving, by a user device, a first Internet Protocol (IP) address from a Dynamic Host Configuration Protocol (DHCP) service, the DHCP service configured to store a number, M, of IP addresses; means for establishing at least one connection between the user device and at least one entity over a network using the first IP address; means for monitoring, by the user device, communication activity over the at least one connection; means for determining a device privacy score, by the user device, the device privacy score based at least in part, on the communication activity; and means for closing the at least one connection if the device privacy score is outside an acceptable privacy score range, the acceptable privacy range bounded by a privacy threshold.

Another example system includes the forgoing components and the means for updating the device privacy score based, at least in part, on a number of connections.

Another example system includes the forgoing components and the means for establishing a secure communication channel between the user device and the DHCP service, the secure communication channel implemented using cryptographic techniques.

Another example system includes the forgoing components and the means for requesting, by a DHCP service, an additional block of IP addresses from an IP address authority if a number of assigned IP addresses exceeds a predefined fraction of M.

Another example system includes the forgoing components and the means for acquiring a contextual privacy score from a context engine, the contextual privacy score based on context information related to at least one of a user and the user device, the device privacy score further based, at least in part, on the contextual privacy score.

Another example system includes the forgoing components and the means for selecting the DHCP service from a plurality of DHCP services, the selection based on a respective DHCP policy of each DHCP service.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A user device comprising:
   a trusted execution environment comprising a client privacy agent configured to request a first Internet Protocol (IP) address from a Dynamic Host Configuration Protocol (DHCP) service and to determine a device privacy score based, at least in part, on a DHCP policy of the DHCP service;
   memory comprising secure storage, the secure storage configured to store the first IP address received from the DHCP service; and
   communication circuitry configured to establish at least one first connection between the user device and at least one entity over a network using the first IP address,
   the client privacy agent further configured to monitor communication activity over the at least one first connection, to update the device privacy score based, at least in part, on the communication activity, and to close the at least one first connection if the device privacy score is outside an acceptable privacy score range, the acceptable privacy range bounded by a privacy threshold;
   wherein said device privacy score is an indicator corresponding to a likelihood that the user device, a user of the user device, or a combination thereof is identifiable; and
   when said at least one first connection is closed:
      the client privacy agent is further configured to, when said at least one first connection is closed, request a second IP address from the DHCP service; and
      the communications circuitry is configured to establish at least one second connection between the user device and the at least one entity over the network using the second IP address.

2. The user device of claim 1, wherein the client privacy agent is configured to update the device privacy score based, at least in part, on a number of connections established using the first IP address.

3. The user device of claim 1, wherein the trusted execution environment further comprises a context engine configured to determine a contextual privacy score, the contextual privacy score based on context information related to at least one of a user and the user device, and the device privacy score is further based, at least in part, on the contextual privacy score.

4. The user device of claim 1, wherein the client privacy agent is configured to establish a secure communication channel between the user device and the DHCP service, the secure communication channel implemented using cryptographic techniques.

5. A system comprising:
   a Dynamic Host Configuration Protocol (DHCP) service configured to store a number, M, of Internet Protocol (IP) addresses; and
   a user device comprising:
      a trusted execution environment comprising a client privacy agent configured to request a first Internet Protocol (IP) address from the DHCP service and to determine a device privacy score based, at least in part, on a DHCP policy of the DHCP service,
      memory comprising secure storage, the secure storage configured to store the first IP address received from the DHCP service, and
      communication circuitry configured to establish at least one first connection between the user device and at least one entity over a network using the first IP address,
      the client privacy agent further configured to monitor communication activity over the at least one first connection, to update the device privacy score based, at least in part, on the communication activity, and to close the at least one first connection if the device privacy score is outside an acceptable privacy score range, the acceptable privacy range bounded by a privacy threshold;
      wherein said device privacy score is an indicator corresponding to a likelihood that the user device, a user of the user device, or a combination thereof is identifiable; and
      when said at least one first connection is closed:
         the client privacy agent is further configured to, when said at least one first connection is closed, request a second IP address from the DHCP service; and
         the communications circuitry is configured to establish at least one second connection between the user device and the at least one entity over the network using the second IP address.

6. The system of claim 5, wherein the client privacy agent is configured to update the device privacy score based, at least in part, on a number of connections established using the first IP address.

7. The system of claim 5, wherein the trusted execution environment further comprises a context engine configured to determine a contextual privacy score, the contextual privacy score based on context information related to at least one of a user and the user device, and the device privacy score is further based, at least in part, on the contextual privacy score.

8. The system of claim 5, wherein the client privacy agent is configured to establish a secure communication channel between the user device and the DHCP service, the secure communication channel implemented using cryptographic techniques.

9. The system of claim 5, wherein the DHCP service is configured to request an additional block of IP addresses from an IP address authority if a number of assigned IP addresses exceeds a predefined fraction of M.

10. The system of claim 5, wherein the client privacy agent is configured to select the DHCP service from a plurality of DHCP services, the selection based on a respective DHCP policy of each DHCP service.

11. A method comprising:
  receiving, by a user device, a first Internet Protocol (IP) address from a Dynamic Host Configuration Protocol (DHCP) service, the DHCP service configured to store a number, M, of IP addresses;
  establishing at least one first connection between the user device and at least one entity over a network using the first IP address;
  monitoring, by the user device, communication activity over the at least one first connection;
  determining a device privacy score, by the user device, the device privacy score based at least in part, on the communication activity; and
  closing the at least one first connection if the device privacy score is outside an acceptable privacy score range, the acceptable privacy range bounded by a privacy threshold; wherein:
  said device privacy score is an indicator corresponding to a likelihood that the user device, a user of the user device, or a combination thereof is identifiable;
  when said at least one first connection is closed, the method further comprises:
    receiving, with the user device, a second IP address from the DHCP service; and
    establishing at least one second connection between the user device and the at least one entity over the network using the second IP address.

12. The method of claim 11, further comprising:
  updating the device privacy score based, at least in part, on a number of connections.

13. The method of claim 11, further comprising establishing a secure communication channel between the user device and the DHCP service, the secure communication channel implemented using cryptographic techniques.

14. The method of claim 11, further comprising requesting, by a DHCP service, an additional block of IP addresses from an IP address authority if a number of assigned IP addresses exceeds a predefined fraction of M.

15. The method of claim 11, further comprising acquiring a contextual privacy score from a context engine, the contextual privacy score based on context information related to at least one of a user and the user device, the device privacy score further based, at least in part, on the contextual privacy score.

16. The method of claim 11, further comprising selecting the DHCP service from a plurality of DHCP services, the selection based on a respective DHCP policy of each DHCP service.

17. A system comprising one or more storage mediums having stored thereon, individually or in combination, instructions that when executed by one or more processors result in the following operations comprising:
  receiving, by a user device, a first Internet Protocol (IP) address from a Dynamic Host Configuration Protocol (DHCP) service, the DHCP service configured to store a number, M, of IP addresses;
  establishing at least one first connection between the user device and at least one entity over a network using the first IP address;
  monitoring, by the user device, communication activity over the at least one first connection;
  determining a device privacy score, by the user device, the device privacy score based at least in part, on the communication activity;
  closing the at least one first connection if the device privacy score is outside an acceptable privacy score range, the acceptable privacy range bounded by a privacy threshold; wherein:
  said device privacy score is an indicator corresponding to a likelihood that the user device, a user of the user device, or a combination thereof is identifiable;
  when said at least one first connection is closed, the method further comprises
    receiving, with the user device, a second IP address from the DHCP service; and
    establishing at least one second connection between the user device and the at least one entity over the network using the second IP address.

18. The system of claim 17, wherein the instructions that when executed by one or more processors result in the following additional operations comprising:
  updating the device privacy score based, at least in part, on a number of connections.

19. The system of claim 17, wherein the instructions that when executed by one or more processors result in the following additional operations comprising:
  establishing a secure communication channel between the user device and the DHCP service, the secure communication channel implemented using cryptographic techniques.

20. The system of claim 17, wherein the instructions that when executed by one or more processors result in the following additional operations comprising:
  requesting, by a DHCP service, an additional block of IP addresses from an IP address authority if a number of assigned IP addresses exceeds a predefined fraction of M.

21. The system of claim 17, wherein the instructions that when executed by one or more processors result in the following additional operations comprising:
  acquiring a contextual privacy score from a context engine, the contextual privacy score based on context information related to at least one of a user and the user device, the device privacy score further based, at least in part, on the contextual privacy score.

22. The system of claim 17, wherein the instructions that when executed by one or more processors result in the following additional operations comprising:
  selecting the DHCP service from a plurality of DHCP services, the selection based on a respective DHCP policy of each DHCP service.

* * * * *